United States Patent
Son (10) Patent No.: US 7,751,151 B2
(45) Date of Patent: Jul. 6, 2010

(54) BASE PLATE HAVING STEPPED PORTION TO RESTRICT ROTATION OF SHIPPING COMB CARRYING HEAD STACK ASSEMBLY AND HARD DISK DRIVE WITH THE BASE PLATE

(75) Inventor: Jung-moo Son, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 967 days.

(21) Appl. No.: 11/498,042

(22) Filed: Aug. 3, 2006

(65) Prior Publication Data
US 2007/0030599 A1 Feb. 8, 2007

(30) Foreign Application Priority Data
Aug. 5, 2005 (KR) .................... 10-2005-0071688

(51) Int. Cl.
*G11B 21/22* (2006.01)
(52) U.S. Cl. .................... 360/256; 360/254.7
(58) Field of Classification Search ............ 360/256, 360/254.7
See application file for complete search history.

(56) References Cited

U.S. PATENT DOCUMENTS

| | | | | |
|---|---|---|---|---|
| 6,452,753 | B1 | 9/2002 | Hiller et al. | 360/254.7 |
| 6,577,473 | B1 | 6/2003 | Machperson et al. | 360/254.7 |
| 7,142,396 | B2 * | 11/2006 | Yao et al. | 360/256 |
| 7,293,351 | B2 * | 11/2007 | Pfeiffer et al. | 29/737 |

FOREIGN PATENT DOCUMENTS

| KR | 10-1999-013506 | 2/1999 |
|---|---|---|
| KR | 1999-013506 | 2/1999 |

* cited by examiner

*Primary Examiner*—A. J. Heinz
(74) *Attorney, Agent, or Firm*—Staas & Halsey LLP (57) ABSTRACT

A base plate and hard disk drive having the base including a head stack assembly installation portion on which a head stack assembly carried by a shipping comb having a middle support portion is rotatably installed; and a step portion formed on a surface of the base plate to restrict rotation of the shipping comb by hooking the middle support portion of the shipping comb when the head stack assembly installed on the head stack assembly installation portion is rotated with the shipping comb coupled to the head stack assembly.

7 Claims, 7 Drawing Sheets

BASE PLATE HAVING STEPPED PORTION TO RESTRICT ROTATION OF SHIPPING COMB CARRYING HEAD STACK ASSEMBLY AND HARD DISK DRIVE WITH THE BASE PLATE

CROSS-REFERENCE TO RELATED APPLICATION

This application claims the benefit of Korean Patent Application No. 10-2005-0071688, filed on Aug. 5, 2005, in the Korean Intellectual Property Office, the disclosure of which is incorporated herein by reference.

BACKGROUND OF THE INVENTION

1. Field of the Invention

The present invention relates to a hard disk drive, and more particularly, to a base plate on which a head stack assembly (HSA) can be easily installed, a hard disk drive having the base plate, and a method of attaching HSA on the base plate.

2. Description of Related Art

A hard disk drive (HDD) a known type of information storing device for computers which reproduces data stored in a disk or records data on the disk using a magnetic head. A head stack assembly (HSA) for supporting the magnetic head to move above the disk is installed on the base plate of the HDD. The HSA is coupled to a protective member called as a shipping comb to prevent a damage that may be generated during a process of installing the HSA on the base plate.

Figure 1:
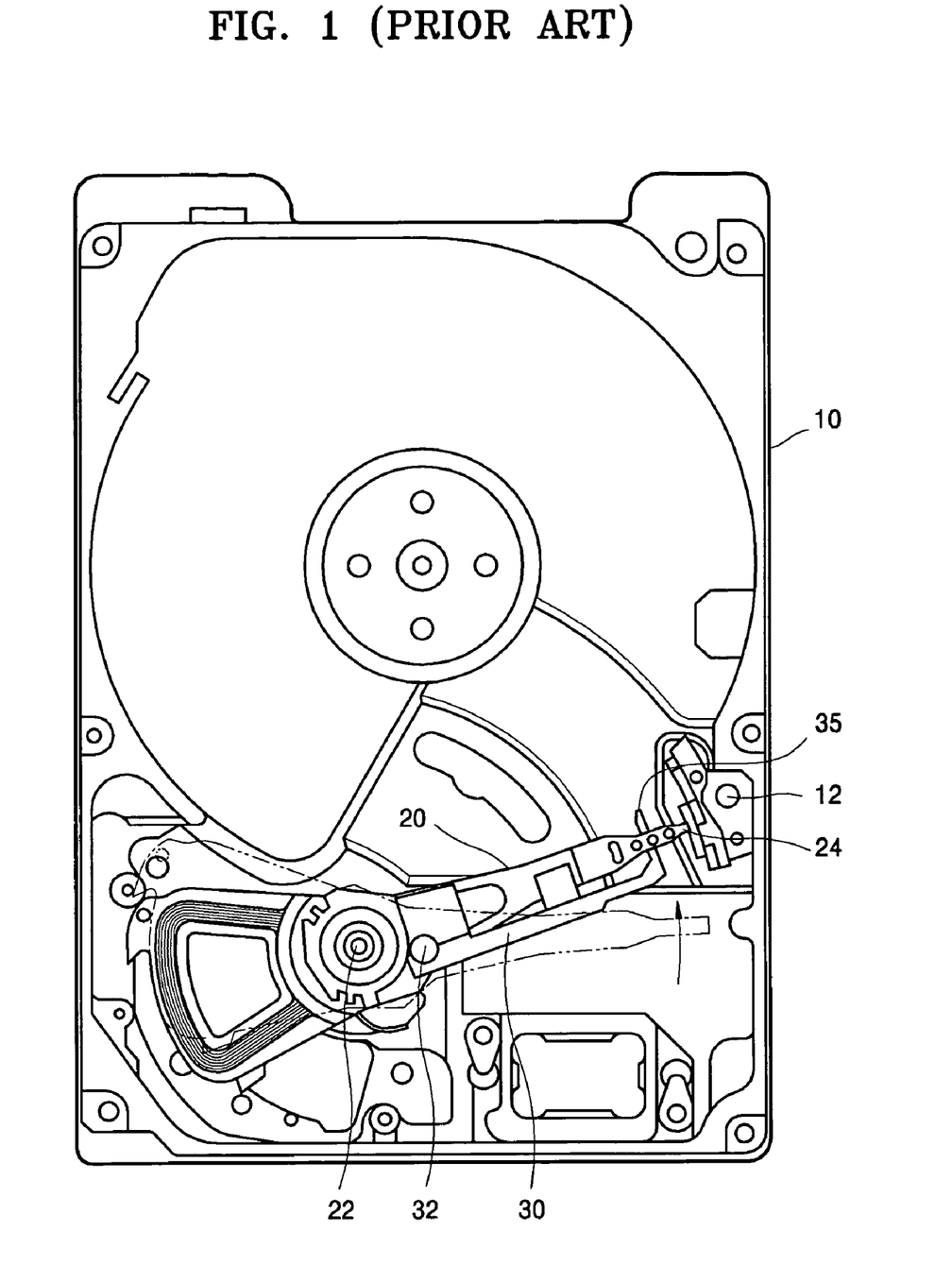
FIG. 1 is a plan view of an HDD in which an HSA is installed on a conventional base plate.

FIG. 1 is a plan view of an HDD in which an HSA is installed on a conventional base plate. Referring to FIG. 1, in the process of installing the HSA on the base plate, an HSA 20 that is coupled to a shipping comb 30 is rotatably installed on a base plate 10 at a pivot center portion 22. At the initial installation, a suspension 24 at an end portion of the HSA 20 is located at the outer side of a ramp 12 that is installed on the base plate 10 as indicated by an imaginary line. Next, the HSA 20 is rotated in a direction indicated by an arrow to be parked on the ramp 12. After the HSA 20 that is parked is fixed, the shipping comb 30 is rotated in the direction opposite to the arrow by holding a handle 32 of the shipping comb 30 so that a suspension spacer 35 at an end portion of the shipping comb 30 is separate from the suspension 24. Then, the handle 32 is lifted so that the shipping comb 30 is entirely separated from the HSA 20.

The above-described conventional HSA installation process may deteriorate productivity of an HDD assembly process because the process of separating the shipping comb 30 is inconvenient. Also, when a dimensional error in the suspension spacer 35 and the ramp 12 is present, as the suspension 24 enters the ramp 12, it bumps into the ramp 12 so that the suspension 24 is damaged and/or particles are generated.

BRIEF SUMMARY

An aspect of the present invention provides a base plate having a simplified structure of separating the shipping comb from the HSA, a hard disk drive with the base plate, and a method for attaching the HSA on the base plate.

An aspect of the present invention provides a base plate having an improved structure to prevent the damage to the suspension or the generation of particles during the installation process of HSA, a hard disk drive with the base plate, and a method for attaching the HSA on the base plate.

According to an aspect of the present invention, a base plate includes a head stack assembly installation portion on which a head stack assembly is rotatably installed, and a step portion restricting rotation of a shipping comb by hooking the shipping comb when the head stack assembly installed on the head stack assembly installation portion is rotated with the shipping comb coupled to the head stack assembly.

The ramp on which the head stack assembly is parked may be installed on the base plate, and a step portion may be formed such that the shipping comb is hooked by the step portion when the head stack assembly rotates in a direction in which the head stack assembly is parked on the ramp.

The position of the step portion may be located so that the shipping comb is hooked by the step portion when an end portion of the head stack assembly that is rotating enters the ramp.

The step portion may include a side surface of a concave groove that is sunken from a surface of the base plate.

The side surface of the concave groove may form an acute angle with respect to the surface of the base plate.

The step portion may include a side surface of a rib that protrudes from the surface of the base plate.

The side surface of the rib may form an acute angle with respect to the surface of the base plate.

According to another aspect of the present invention, a hard disk drive includes a base plate, and a head stack assembly which is rotatably installed on the base plate, wherein the base plate includes a head stack assembly installation portion on which a head stack assembly is rotatably installed, and a step portion restricting rotation of a shipping comb by hooking the shipping comb when the head stack assembly installed on the head stack assembly installation portion is rotated with the shipping comb coupled to the head stack assembly.

The hard disk drive may also include a ramp installed on the base plate, on which the head stack assembly is parked, and a step portion is formed such that the shipping comb is hooked by the step portion when the head stack assembly rotates in a direction in which the head stack assembly is parked on the ramp.

The position of the step portion may be located so that the shipping comb is hooked by the step portion when an end portion of the head stack assembly that is rotating enters the ramp.

The step portion may include a side surface of a concave groove that is sunken from a surface of the base plate.

The side surface of the concave groove may form an acute angle with respect to the surface of the base plate.

The step portion may include a side surface of a rib that protrudes from the surface of the base plate.

The side surface of the rib may form an acute angle with respect to the surface of the base plate.

According to another aspect of the present invention, a method of attaching a head stack assembly includes installing the head stack assembly with a shipping comb coupled thereto on a base plate to be capable of rotating, rotating the head stack assembly with the shipping comb on the base plate and separating a side portion of the shipping comb from the head stack assembly as the shipping comb is hooked by a step portion of the base plate during the rotation of the head stack assembly, and completely separating the shipping comb from the head stack assembly.

The head stack assembly may be parked on a ramp that is installed on the base plate by the rotation of the head stack assembly.

The side portion of the shipping comb may be separated from the head stack assembly as the shipping comb is hooked by the step portion when an end portion of the head stack assembly that is rotating enters the ramp.

According to another aspect of the present invention, there is provided a shipping comb, including: a suspension spacer at a first end, the suspension spacer configured to fit between a pair of sliders of a head stack assembly (HSA); an insertion portion at a second end, the insertion portion configured to be accepted by an installation hole of a swing arm of the HSA; a support between the suspension spacer and the insertion portion and extending in a second direction opposite the first, the support configured to engage a side surface of step portion of a base plate or of a rib extending from a surface of the base plate, the engagement of the support and the side surface restricting partial rotation of the shipping comb when the shipping comb is coupled to the HSA; and a handle at the second end, the handle extending from the shipping comb in the second direction.

According to another aspect of the present invention, there is provided a method of assembling a hard disk drive (HDD), including: coupling a shipping comb with a head stack assembly (HSA) so that a suspension spacer of the shipping comb is between a pair of sliders of the (HSA) and an insertion protrusion is inserted into an installation hole of a swing arm of the HSA; rotatably installing the HSA with the shipping comb combined therewith on a base plate; rotating the installed HSA so that a support of the shipping comb is hooked by a step portion of the base plate and an end tab of the HSA is over a ramp on the base plate; and separating the shipping comb from the HSA after the rotating.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are shown in the accompanying drawings, wherein like reference numerals refer to the like elements throughout. The embodiments are described below in order to explain the present invention by referring to the figures.

Figure 2:
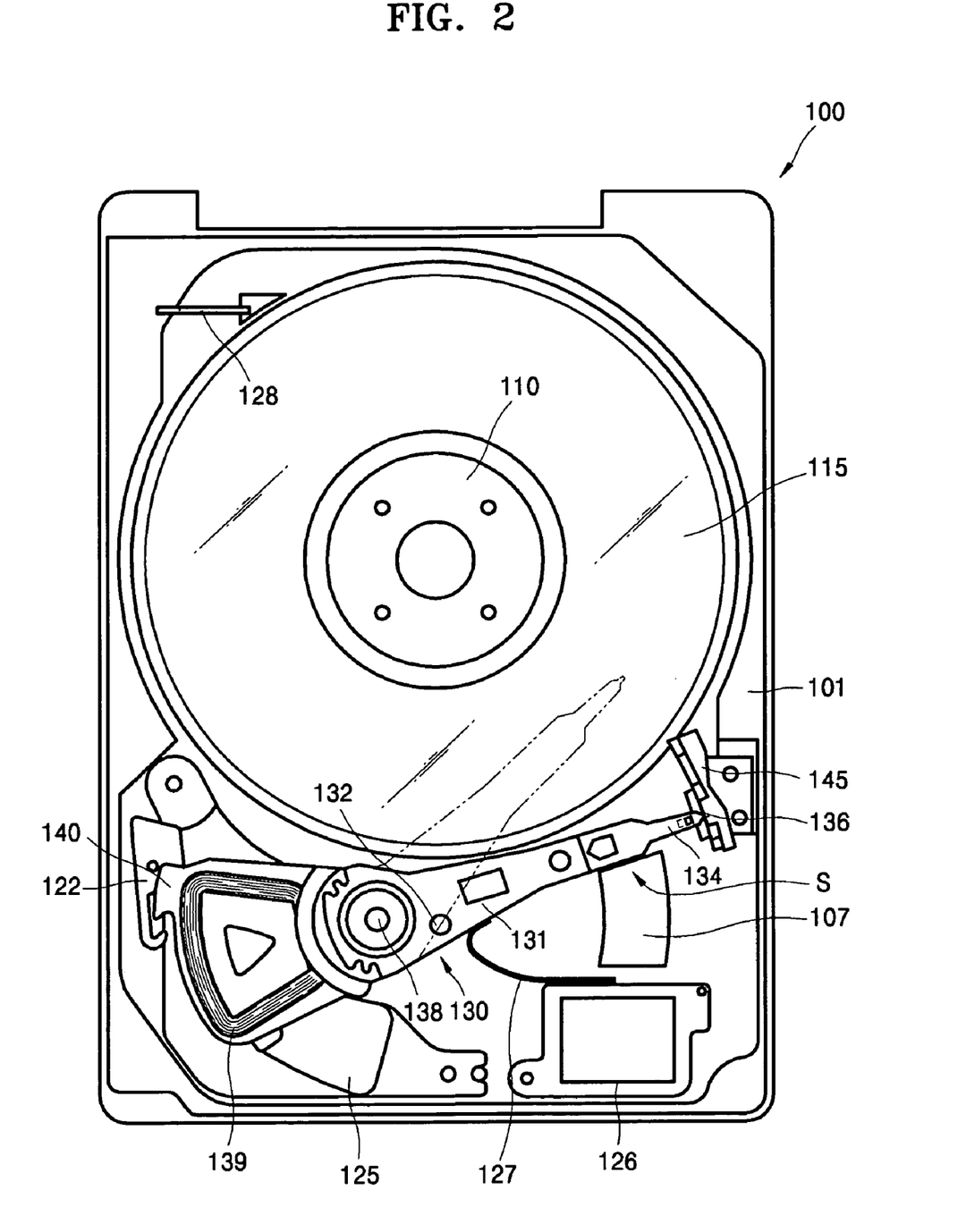
FIG. 2 is a plan view of an HDD according to an embodiment of the present invention.

FIG. 2 is a plan view of an HDD according to an embodiment of the present invention.

Figure 3:
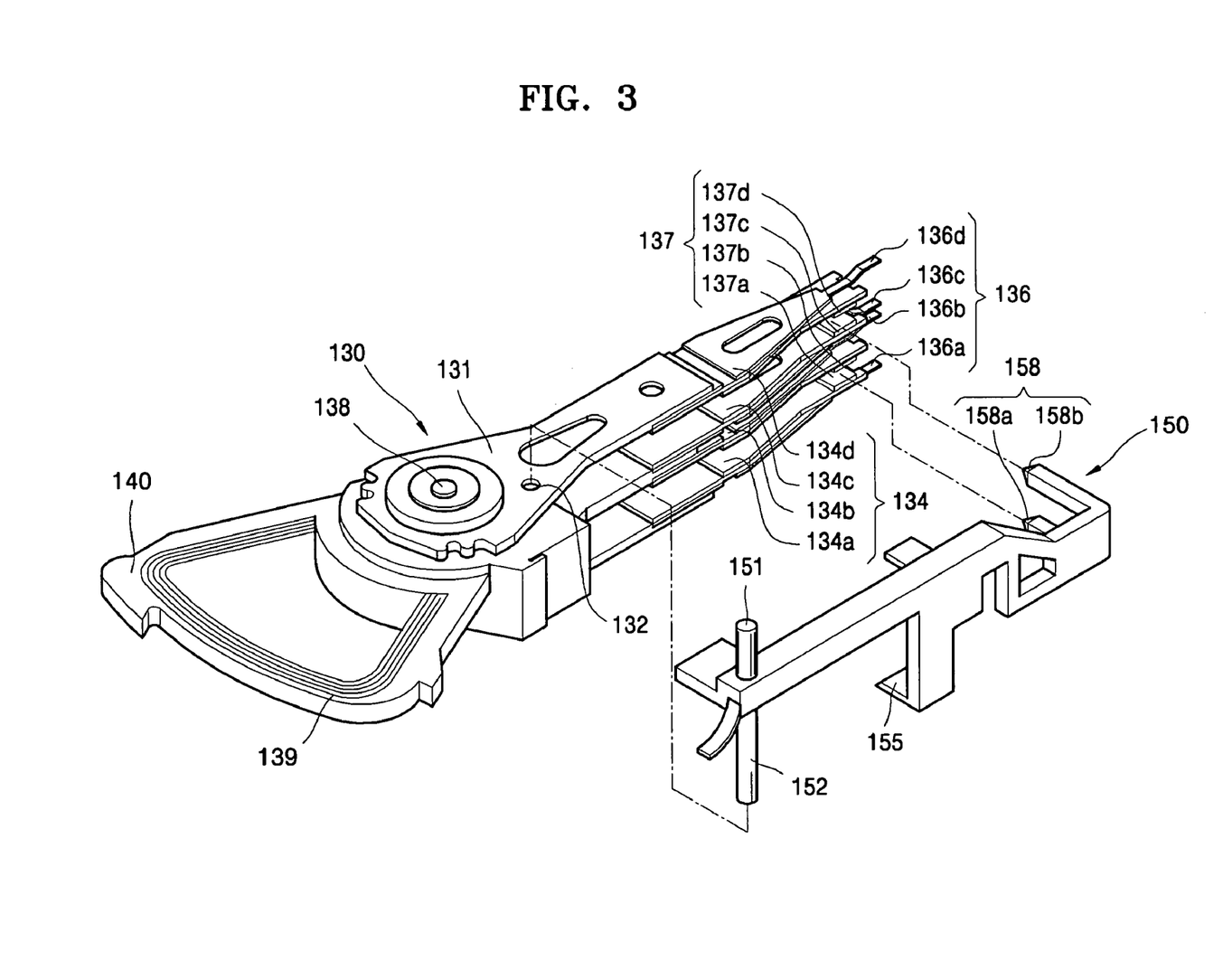
FIG. 3 is a perspective view of an HSA and a shipping comb that is a carrier of the HSA.
Figure 4:
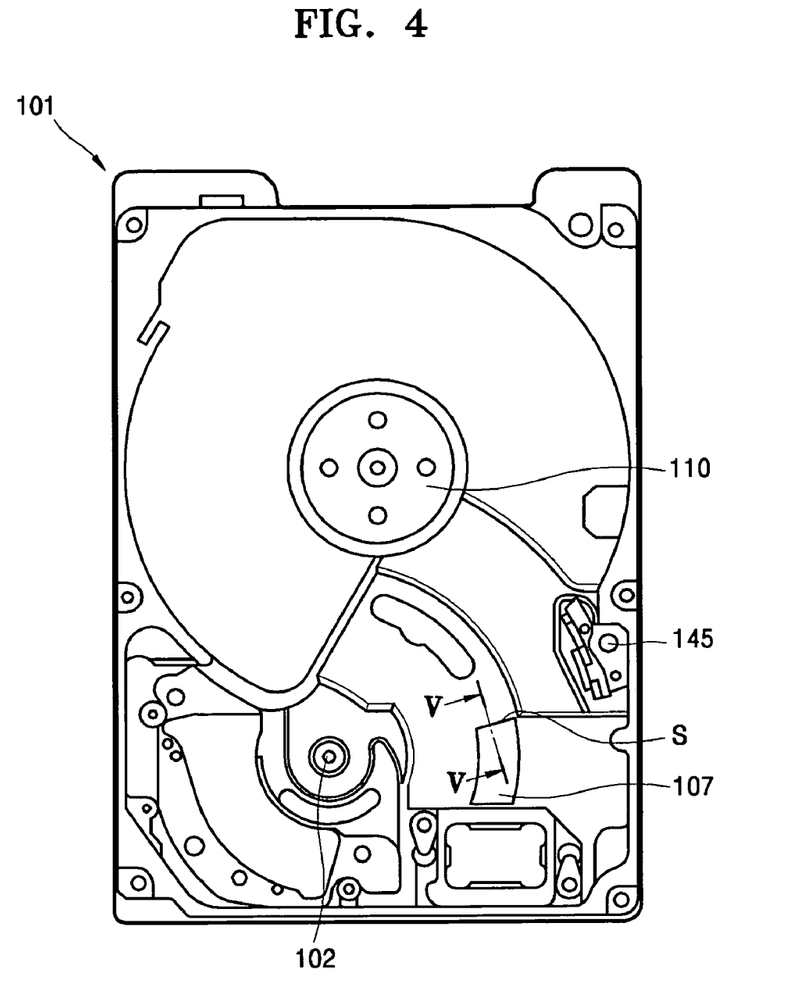
FIG. 4 is a plan view of a base plate according to an embodiment of the present invention.
Figure 5:
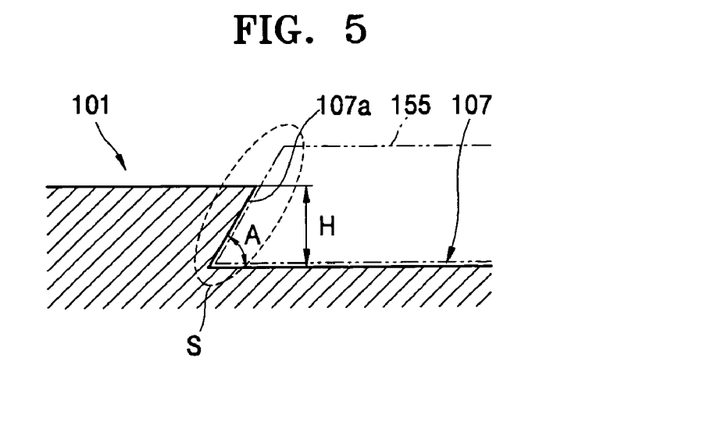
FIG. 5 is a cross-sectional view taken along line V-V of FIG. 4.

FIG. 3 is a perspective view of an HSA and a shipping comb that is a carrier of the HSA. FIG. 4 is a plan view of a base plate according to an embodiment of the present invention. FIG. 5 is a cross-sectional view taken along line V-V of FIG. 4

Referring to FIGS. 2-5, a hard disk drive 100 according to an embodiment of the present invention includes a housing (not shown) formed of a base plate 101 and a cover member (not shown) coupled to the base plate 101. A spindle motor 110, a disk 115, a head stack assembly (HSA) 130, a voice coil motor (VCM) 125, and a ramp 145 are included in the housing.

The spindle motor 110 rotates the disk 115 and is fixedly installed on the base plate 101. The disk 115 has a recording surface where data is recorded is coupled to the spindle motor 110 and rotates together. The disk 115 is provided in a pair to store a large amount of data.

The HSA 130 on which a magnetic head (not shown) is mounted records data on the disk 115 or reads data from the disk 115 by moving the magnetic head to a predetermined position on the disk 115. The HSA 130 includes a swing arm 131, a suspension 134 fixedly coupled to an end portion of the swing arm 131, and a slider 137 attached to an end portion of the suspension 134 and supported thereby. The HSA 130 is coupled to an HSA installation portion 102 that is provided on the base plate 101, to be capable of rotating around a pivot center portion 138.

As shown in FIG. 3, the swing arm 131 HSA a lateral shape of a letter "E" and two pairs of suspensions 134a, 134b, 134c, and 134d are attached at an end portion of the swing arm 131. Sliders 137a, 137b, 137c, and 137d are respectively attached to end portions of the suspensions 134a, 134b, 134c, and 134d and supported to be elastically biased toward the corresponding surfaces of the disk 115. End tabs 136a, 136b, 136c, and 136d contacting the ramp 145 and supported thereon when the HSA 130 is parked on the ramp 145 are provided at end portions of the suspensions 134a, 134b, 134c, and 134d. The ramp 145 where the HSA 130 is parked is fixedly installed on the base plate 101.

As shown in FIG. 2, when the disk 115 rotates at high speed above the base plate 101, a lift force acts on the slider 137. The slider 137 maintains a floating state at a height where the lift force and a pressing force of the suspension 134 that is elastically biased toward the disk 115 are balanced. In the floating state, the magnetic head mounted on the slider 137 reproduces or records data with respect to a recording surface 111 of the disk 115.

The voice coil motor 125 fixedly installed on the base plate 101 provides a rotational power to the HSA 130. The voice coil motor 125 includes a magnet (not shown) arranged at the upper and lower sides of the VCM coil 139 of the HSA 130. The voice coil motor 125 is controlled by a servo control system (not shown) and rotates the HSA 130 around the pivot center portion 138 by the interaction between current applied to the VCM coil 139 and the magnetic field formed by a magnet in a direction following the Fleming's left hand.

When a command to stop operation is input to the hard disk drive 100, the voice coil motor 125 rotates the HSA 130 clockwise so that the slider 137 in a loading state located above the recording surface of the disk 115 moves toward the ramp 145 and enters an unloading state. In contrast, when a command to start operation is input to the hard disk drive 100 the voice coil motor 125 rotates the HSA 130 counterclockwise so that the slider 137 in the unloading state where the slider 137 is parked on the ramp 145 enters the loading state where the slider 137 is located above the recording surface of the disk 115.

When the slider 137 is parked on the ramp 145, as the HSA 130 is rotated by an external impact or vibration applied to the hard disk drive 100, the slider 137 and the disk 115 contact each other and may be damaged. Thus, there is a need to lock the HSA 130 at a particular position not to arbitrarily rotate while the slider 137 is parked on the ramp 145. For this purpose, the hard disk drive 100 includes a latch 122. A notch 140 for stopping the clockwise rotation of the HSA 130 by interfering with the latch 122 is provided at the HSA 130.

A flexible printed circuit (FPC) bracket 126 for connecting an FPC 127 connected to the HSA 130 to a main circuit board (not shown) arranged under the base member 101 is provided at a corner portion of the base plate 101. A circulation filter 128 for filtering foreign materials such as particles included in air flowing in the hard disk drive 100 is provided at the other corner that is diagonal to the corner portion where the FPC bracket 126 is installed.

As shown in FIG. 3, the HSA 130 is carried while coupled to the shipping comb 150 that is a protective member and installed on the base plate 101. The shipping comb 150 includes a handle 151, an insertion protrusion 152 that is cylindrical and inserted into a shipping comb installation hole 132 provided in the HSA 130, a pair of upper and lower suspension spacers 158a and 158b provided at an end portion thereof, and a middle support portion 155 provided between the insertion protrusion 152 and the suspension spacers 158a and 158b.

The lower suspension spacer 158a is inserted between the lower pair of suspensions 134a and 134b to maintain a particular gap between the suspensions 134a and 134b while the upper suspension spacer 158b is inserted between the upper pair of suspensions 134c and 134d to maintain a particular gap between the suspensions 134c and 134d. The middle support portion 155 supports the swing arm 131 by holding a tip end portion of the swing arm 131 to prevent the swing arm 131 and the suspensions 134 from being deformed.

As shown in FIGS. 4 and 5, the base plate 101 includes a step portion S for restricting the rotation the HSA 130 by hooking the shipping comb 150 when the HSA 130 installed on the HSA installation portion 102 rotates with the shipping comb 150 coupled thereto. The step portion S includes a side surface 107a in a direction of the spindle motor 110 of a concave groove 107 that is sunken from the surface of the base plate 101. The position of the step portion S is determined such that the middle support portion 155 of the shipping comb 150 is hooked by the step portion S when the HSA 130 rotates counterclockwise to be parked on the ramp 145 from the outside of the ramp 145. Also, the position of the step portion S is determined such that the middle support portion 155 is hooked by the step portion S when an end tap 136 of FIG. 2 at the end portion of the HSA 130 that rotates counterclockwise to be parked on the ramp 145 enters the ramp 145.

The side surface 107a of the concave groove 107 forming the step portion S forms an acute angle A with respect to the surface of the base plate 101 and the concave groove 107 parallel thereto. This is to prevent the possibility of the middle portion 155 sliding along the step portion S without being stopped by the step portion S when the angle A is obtuse. The side surface 107a having the acute angle A improves reliability in the HSA 130 installation process. Since the height H of the step portion S is related to the overall thickness of the hard disk drive 100 and the stiffness of the base plate 101, there is a limit in increasing the height and also in decreasing the height to obtain reliability in operation. In the present embodiment, the height H of the step portion S is about 0.15 mm.

Figure 6:
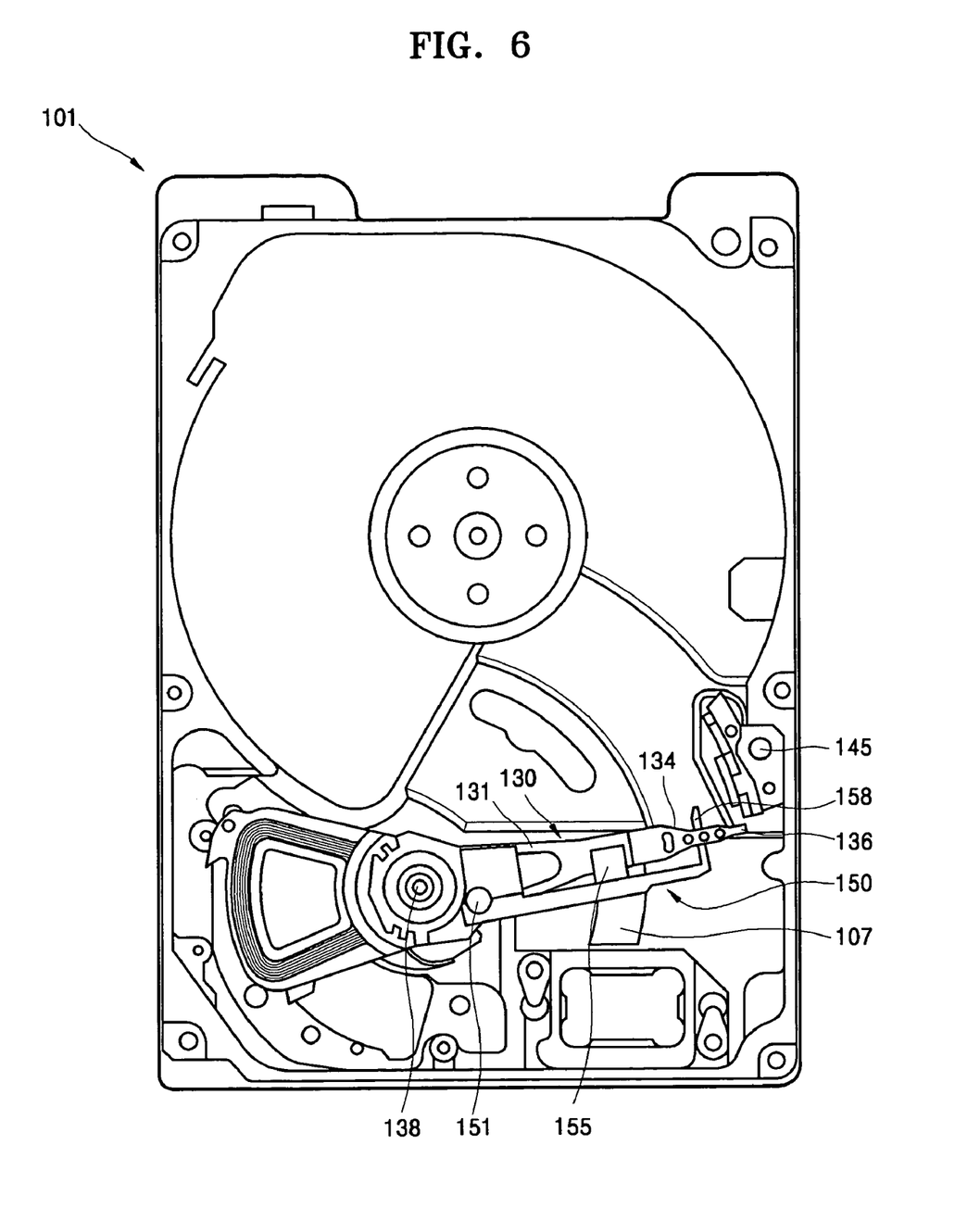
FIGS. 6 and 7 are plan views showing the process of attaching the HSA on the base plate of FIG. 4.
Figure 7:
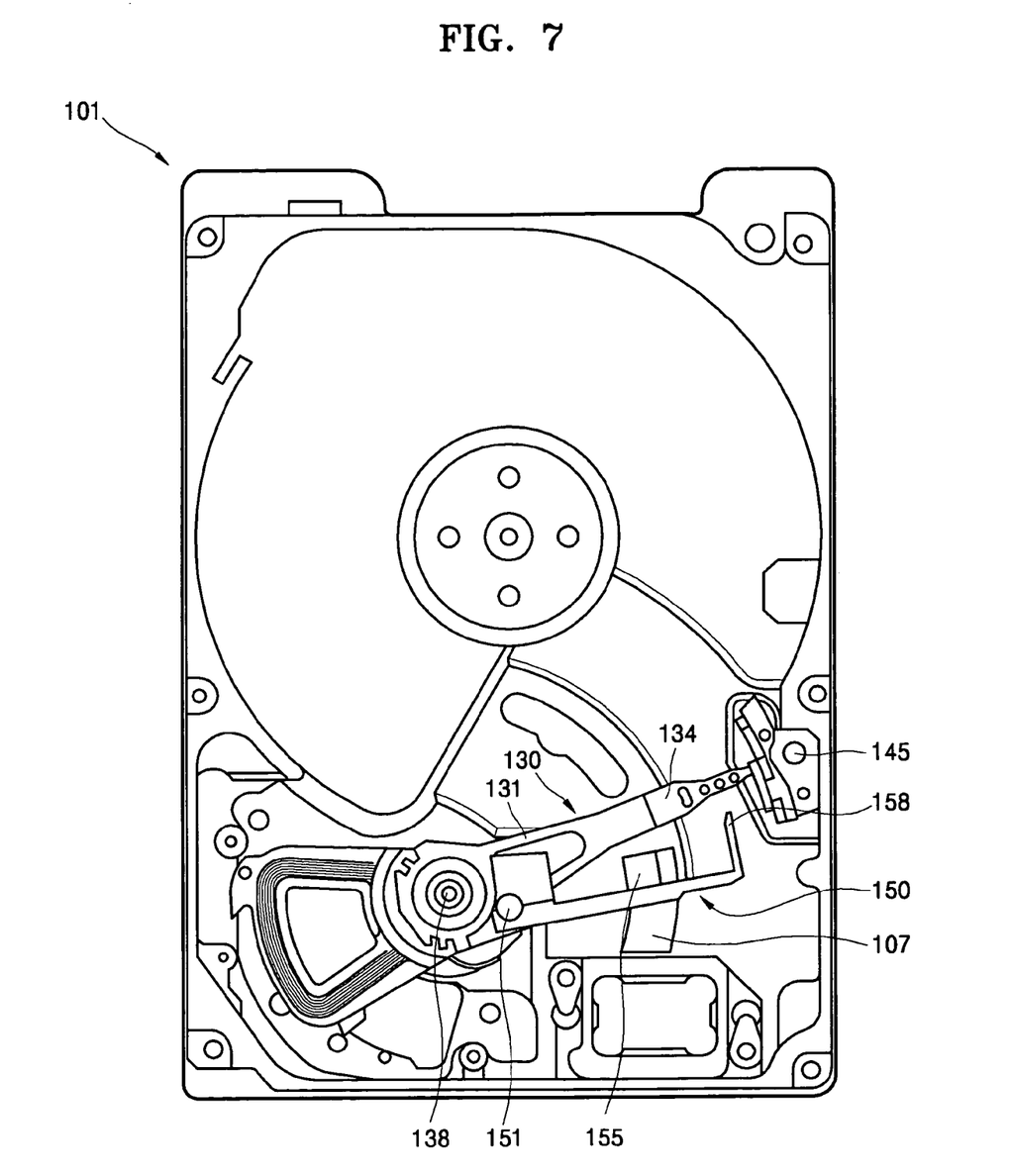

FIGS. 6 and 7 are plan views showing the process of attaching the HSA on the base plate of FIG. 4. The method of attaching the HSA according to the embodiment of the present invention will be described with reference to FIGS. 3, 6, and 7.

First, the shipping comb 150 is coupled to the HSA 130. As shown in FIG. 3, the insertion protrusion 152 of the shipping comb 150 is inserted into the shipping comb installation hole 132 of the HSA 130. The shipping comb 150 is rotated counterclockwise around the insertion protrusion 152 with respect to the HSA 130 so that the suspension spacers 158a and 158b are respectively interposed between the lower suspensions 134a and 134b and the upper suspensions 134c and 134d, and the support portion 155 supports the end portion of the swing arm 131.

Next, the HSA 130 with the shipping comb 150 coupled thereto is rotatably installed on the HSA installation portion 102 of FIG. 4. As shown in FIG. 6, the end tab 136 is located outside the ramp 145 and the middle support portion 155 of the shipping comb 150 is located at the concave groove 107.

Next, the HSA 130 is rotated on the base plate 101 in the counterclockwise direction in which the HSA 130 is parked on the ramp 145. During the rotation of the HSA 130, that is, when the end tab 136 enters the ramp 145 as shown in FIG. 6, the middle support portion 155 of the shipping comb 150 is hooked by the step portion S to stop the rotation. In the meantime, the HSA 130 continues to rotate until the end tab 136 is finally accommodated on the ramp 145. Accordingly, as shown in FIG. 7, when the HSA 130 is parked on the ramp 145, the suspension spacers 158 and the middle support portion 155 of the shipping comb 150 are separated from the HSA 130.

Next, as the handle 151 of the shipping comb 150 is lifted, the insertion protrusion 152 of FIG. 3 is detached from the shipping comb installation hole 132 of FIG. 3 so that the shipping comb 150 is completely separated from the HSA 130.

Figure 8:
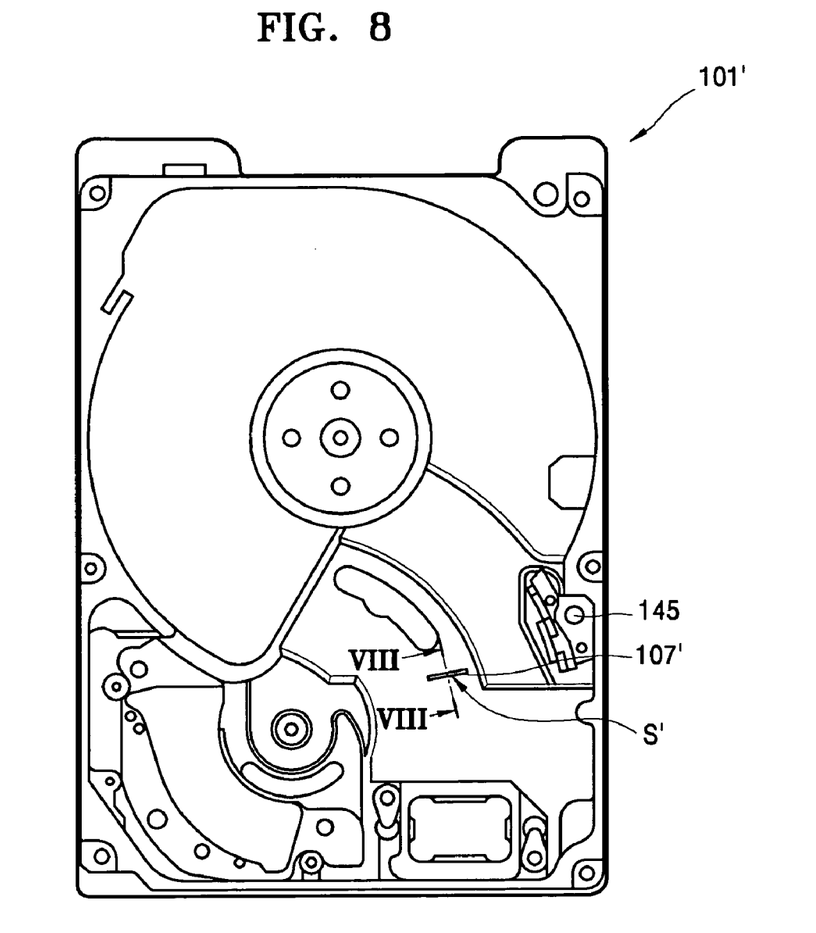
FIG. 8 is a plan view of a base plate according to another embodiment of the present invention.
Figure 9:
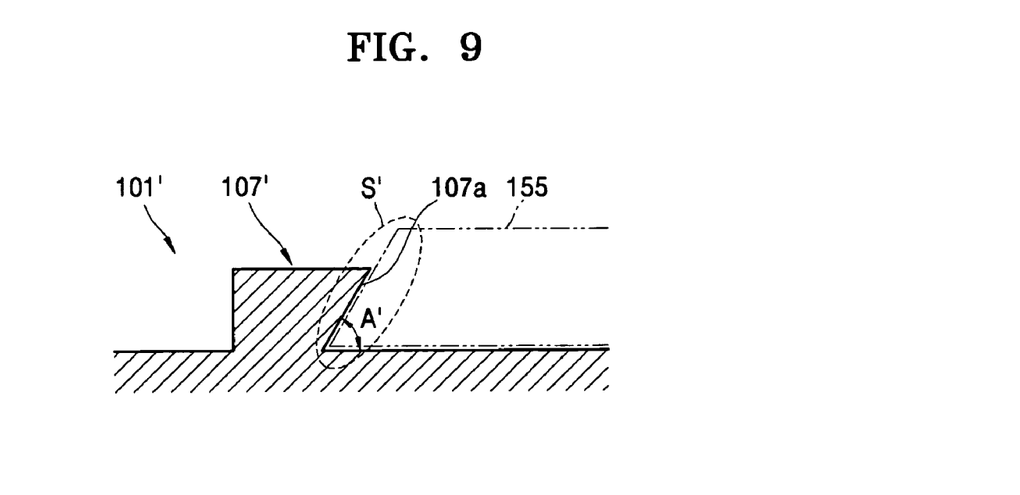
FIG. 9 is a cross-sectional view taken along line VIII-VIII of FIG. 8.

FIG. 8 is a plan view of a base plate according to another embodiment of the present invention. FIG. 9 is a cross-sectional view taken along line VIII-VIII of FIG. 8. Referring to FIGS. 8 and 9, a base plate 101' does not have the concave groove 107 unlike the previous embodiment shown in FIGS. 4 and 5. The base plate 101' includes a step portion S' including a side surface 107a' of a rib 107' protruding from the surface of the base plate 101'. The side surface 107a' of the rib 107' forms an acute angle A' like the side surface 107a of the concave groove 107 of the previous embodiment. Since the function of the step portion S' and the method for attaching the HSA 130 on the base plate 101' are the same as those in the previous embodiment, the descriptions thereof will be omitted herein. Since in the base plate 101' according to the present embodiment the concave groove 107 of FIG. 4 is not formed by etching, the deterioration of the stiffness of the base member 101' can be prevented. Thus, the present embodiment of the present invention is suitable for a compact hard disk drive in which the thickness of the base plate 101' cannot be increased.

According to the above-described embodiment of the present invention, since the process of attaching the HSA on the base plate can be simplified, productivity in the hard disk drive assembly process can be improved. Also, the suspension spacer of the shipping comb is separated from the suspension when the end tab of the HSA enters the ramp. Thus, even when the suspension bumps against the ramp due to a dimensional error in the ramp and the suspension, since the suspensions are elastically deformed, the generation of particles due to the bump against the ramp is restricted.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hard disk drive comprising:
   a base plate;
   a head stack assembly which is rotatably installed on the base plate; and
   a shipping comb to carry the head stack assembly, the shipping comb including a handle, an insertion protrusion that is inserted into the head stack assembly, a pair of upper and lower suspension spacers, and a middle support portion provided between the insertion protrusion and the suspension spacers,
   wherein the base plate comprises a head stack assembly installation portion on which the head stack assembly is rotatably installed, and a step portion formed on a surface of the base plate to restrict rotation of the shipping comb by hooking the middle support portion of the shipping comb when the head stack assembly installed on the head stack assembly installation portion is rotated with the shipping comb coupled to the head stack assembly.

2. The hard disk drive as claimed in claim 1, further comprising:
   a ramp installed on the base plate, on which the head stack assembly is parked,
   wherein the step portion is formed such that the middle support portion of the shipping comb is hooked by the step portion when the head stack assembly rotates in a direction in which the head stack assembly is parked on the ramp.

3. The hard disk drive as claimed in claim 2, wherein the step portion is positioned so that the middle support portion of the shipping comb is hooked by the step portion when an end portion of the head stack assembly that is rotating enters the ramp.

4. The hard disk drive as claimed in claim 1, wherein the step portion comprises a side surface of a concave groove that is sunken from the surface of the base plate.

5. The hard disk drive as claimed in claim 4, wherein the side surface of the concave groove forms an acute angle with respect to the surface of the base plate.

6. The hard disk drive as claimed in claim 1, wherein the step portion comprises a side surface of a rib that protrudes from the surface of the base plate.

7. The hard disk drive as claimed in claim 6, wherein the side surface of the rib forms an acute angle with respect to the surface of the base plate.

* * * * *